United States Patent
Ono et al.

(10) Patent No.: US 7,336,798 B2
(45) Date of Patent: Feb. 26, 2008

(54) SPEAKER APPARATUS AND METHOD OF MANUFACTURING THE SAME

(75) Inventors: Toshiyuki Ono, Yamagata (JP); Tatsuya Suzuki, Yamagata (JP)

(73) Assignees: Pioneer Corporation, Tokyo (JP); Tohoku Pioneer Corporation, Yamagata (JP)

(*) Notice: Subject to any disclaimer, the term of this patent is extended or adjusted under 35 U.S.C. 154(b) by 570 days.

(21) Appl. No.: 11/033,269

(22) Filed: Jan. 12, 2005

(65) Prior Publication Data
US 2005/0152569 A1   Jul. 14, 2005

(30) Foreign Application Priority Data
Jan. 14, 2004   (JP) ............... P2004-007094

(51) Int. Cl.
*H04R 25/00* (2006.01)
(52) U.S. Cl. .............. 381/433; 381/386; 381/398; 381/409
(58) Field of Classification Search ........... 381/87, 381/386, 396, 398, 403, 409, 412, 419, 420, 381/430, 433; 181/171, 172, 198, 199; 29/594, 29/609.1
See application file for complete search history.

(56) References Cited
U.S. PATENT DOCUMENTS
7,167,573 B2 * 1/2007 Williamson ............ 381/403
7,245,739 B2 * 7/2007 Suzuki ................... 381/430

FOREIGN PATENT DOCUMENTS
JP   2003-143676 A   5/2003
JP   2003-333689 A   11/2003

* cited by examiner

*Primary Examiner*—Huyen Le
(74) *Attorney, Agent, or Firm*—Sughrue Mion, PLLC

(57) ABSTRACT

A frame with a pot type yoke incorporated therein is held on a seating base, and an adhesive supplying means is disposed at a position located in close proximity to this seating base. A supply head of this adhesive supplying means has its supply port opposing an end face of an annular portion. The supply of the adhesive is effected while the seating base is rotated, and the adhesive is supplied starting with one groove, and is supplied continuously up to the other groove.

5 Claims, 5 Drawing Sheets

SPEAKER APPARATUS AND METHOD OF MANUFACTURING THE SAME

CROSS-REFERENCE TO RELATED APPLICATION

The invention claims priority to Japanese Patent Application No. JP 2004-007094 filed on Jan. 14, 2004. The disclosure of the prior application is incorporated herein by reference in its entirety.

BACKGROUND OF THE INVENTION

1. Field of the Invention

The present invention relates to a speaker apparatus and a method of manufacturing the same.

2. Description of the Related Art

Conventionally, speaker apparatuses are extensively used for not only acoustic equipment but also household electrical appliances, portable telephones, and other various products.

As one example of conventional speaker apparatuses, JP-A-2003-333689 discloses a compact speaker which is used for, for example, a portable telephone or the like.

In addition, as for a method of manufacturing a speaker, one example of assembling a magnetic circuit and a case for accommodating the magnetic circuit is disclosed in JP-A-2003-143676.

Incidentally, in the conventional speaker apparatus, a resin-made frame 100 and a metallic pot type yoke 90, such as those shown in FIG. 1, are fitted to each other and are fixed by an adhesive.

It should be noted that, for instance, a magnet, a top plate, a sound absorbing material, and the like, although not shown, are appropriately laminated and disposed inside the pot type yoke 90, and a magnetic circuit is formed by the top plate, the magnet, and the pot type yoke 90.

A description will be given of the supply of the adhesive in the aforementioned fitted state.

In the assembly of the speaker apparatus, after the pot type yoke 90 is fitted in the frame 100, the fitted assembly is appropriately held by an unillustrated seating base. Meanwhile, an adhesive supply head 111 having a supply port 112 for supplying an adhesive is disposed at an end face 102 of an annular portion 101 of the frame 100.

In such a state, if the seating base is rotated 360 degrees (rotated in the direction of arrow C, for example), and the adhesive is discharged from the supply port 112 to the end face 102 of the annular portion 101. By effecting such an operation by an automated machine, it is possible to automatically perform the supply of the adhesive. Namely, as the adhesive supply head 111 and the frame 100 are relatively moved, the adhesive is supplied over the entire peripheries of the frame 100 and the pot type yoke 90. In particular, since a plurality of grooves 103 are formed at predetermined intervals on the inner side of the annular portion 101 of the frame 100, as shown in FIG. 1, these grooves 103 serve as adhesive pools, so that the bonding area with respect to the frame 100 becomes large, making it possible to securely bond and fix both members.

SUMMARY OF THE INVENTION

As described above, as an adhesive supply head 111 is relatively moved with respect to a frame 100, it is possible to uniformly supply an adhesive over the entire periphery of the frame 100. However, a problem is arisen as one example in a case where a projecting portion which hampers a relative movement of the adhesive supply head 111 is present on an outer peripheral portion of the frame 100, the adhesive cannot be supplied well.

To solve the problem, according to an aspect of the invention, there is provided a speaker apparatus including: a frame having an annular portion; and a member for configuring a magnetic circuit, which is fixed to an inner side of the annular portion by means of an adhesive, wherein the frame has a projecting portion disposed on an outer peripheral side of the annular portion and projecting more than an end face of the annular portion, a plurality of grooves are formed on an inner peripheral surface of the frame and respectively have open ports communicating with the end face, and the open port of the groove, which is formed on a portion of an inner peripheral surface of the annular portion which substantially corresponds to a portion on which the projecting portion is provided, is partially open outward more than the projecting portion in a circumferential direction of the frame.

According to another aspect of the invention, there is provided a method of manufacturing a speaker apparatus including steps of inserting a member for configuring a magnetic circuit to an inner side of an annular portion of a frame and supplying an adhesive to a gap between the annular portion and the member through adhesive supplying means, including steps of: using a member as the frame, which has a projecting portion disposed on an outer peripheral side of the annular portion and projecting more than an end face of the annular portion, a groove being formed on a portion of an inner peripheral surface of the annular portion of the frame that corresponds to a portion on which the projecting portion is provided, the groove having an open port communicating with the end face and being partially open outward more than the projecting portion in a circumferential direction of the frame; and supplying the adhesive to a part of the open port, which is open outward more than the projecting portion in the circumferential direction of the frame by the adhesive supplying means.

BRIEF DESCRIPTION OF THE DRAWING

These and other objects and advantages of this invention will become more fully apparent from the following detailed description taken with the accompanying drawings in which.

DETAILED DESCRIPTION OF THE PREFERRED EMBODIMENTS

Figure 1:
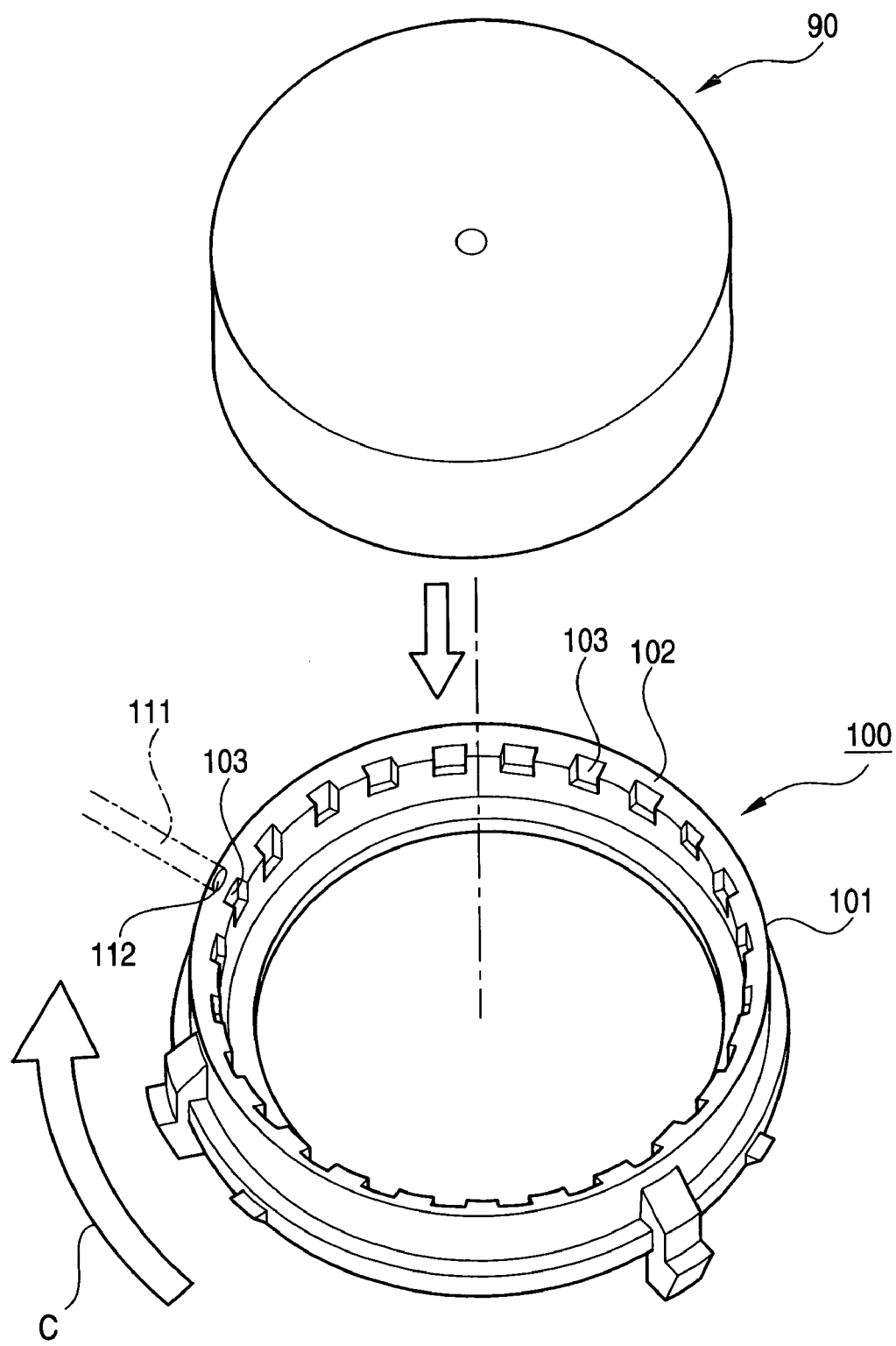
FIG. 1 is a perspective view showing a portion of a conventional speaker apparatus.

Hereafter, embodiments of a speaker apparatus and a method of manufacturing the same according to the invention will be described.

In the speaker apparatus according to the invention, a member configuring a magnetic circuit is fixed to an inner side of an annular portion of a frame by means of an adhesive. Further, the frame has a projecting portion disposed on an outer peripheral side of the annular portion and projecting more than an end face of the annular portion. A plurality of grooves are formed on an inner peripheral surface of the frame and respectively have open ports communicating with the end face of the frame. Further, each open port of the groove, which is formed on a portion of the inner peripheral surface of the frame corresponding to a portion on which the projecting portion is provided, is partially open outward more than the projecting portion in a circumferential direction of the frame.

Thus, the open port of the groove which is formed on that portion of the inner peripheral surface of the frame which substantially corresponds to the projecting portion projecting more than the end face of the annular portion of the frame is open outward more than the projecting portion in the circumferential direction of the frame. Therefore, an adhesive supplying means is capable of allowing the adhesive to flow to the groove on the inner peripheral surface of the frame located on the inner side of the projecting portion by supplying the adhesive to this opening from the side of the projecting portion, making it possible to supply the adhesive uniformly to the entire area of the annular portion of the frame.

In the aspect of the invention, the projecting portion may be a connector which is electrically connected to an external circuit.

According to the configuration described above, a height of the connector can be configured to be greater than a height of the end face of the frame, which makes it possible to enlarge a fitting depth or the like of the connector. Therefore, it is possible to ensure reliable connection, make uniform the fixation by the adhesive, and prevent a decline in the fixing strength.

In addition, the projecting portion is not limited to the connecter, and may be a boss or fixing the frame and another member, or various other component members. According to the aspect of the invention, it is possible to eliminate restrictions on such as a limit to a size of a component member attached to the frame.

In the aspect of the invention, a groove width of the groove which is formed on that portion of the inner peripheral surface of the frame which substantially corresponds to the projecting portion is preferably configured to be greater than the groove width of other ones of the grooves.

Since the groove width of the groove corresponding to the projecting portion is thus arranged to be greater than the groove width of the other grooves, the groove is able to be easily open to the outer side of the projecting portion in the circumferential direction of the annular portion.

According to another aspect of the invention, a method of manufacturing a speaker apparatus includes steps of inserting a member for configuring a magnetic circuit to an inner side of an annular portion of a frame and supplying an adhesive to a gap between the annular portion and the magnetic circuit. The method of manufacturing the speaker apparatus uses a member as the frame, which has a projecting portion disposed on an outer peripheral side of the annular portion and projecting more than an end face of the annular portion, a groove being formed on a portion of an inner peripheral surface of the annular portion of the frame that corresponds to a portion on which the projecting portion is provided, the groove having an open port communicating with the end face of the annular portion and being partially open outward more than the projecting portion in a circumferential direction of the frame, and includes a step of supplying the adhesive to the open port which is open outwardly, in the circumferential direction of the frame, of the projecting portion by means of the adhesive supplying means.

Thus, in the step of supplying the adhesive to the gap between the annular portion and the member for configuring the magnetic circuit by means of the adhesive supplying means, the frame is used in which the open port of the groove which is formed on that portion of the inner peripheral surface of the frame which corresponds to the projecting portion projecting more than the end face of the annular portion of the frame is open outward more than the projecting portion in the circumferential direction of the frame. Consequently, the adhesive can be supplied by causing the adhesive supplying means to correspond to this opening from the side of the projecting portion. Therefore, even in the case of the frame in which the projecting portion is formed, by using an automated machine, for example, it is possible to allow the adhesive to flow to the groove on the inner peripheral surface of the frame located on the inner side of the projecting portion. Hence, the assembling efficiency is made excellent, and it becomes possible to supply the adhesive uniformly to the entire area of the annular portion of the frame.

In the aspect of the invention, the adhesive is supplied as the adhesive supplying means is moved relative to the frame along the annular portion of the frame over an area excluding the projecting portion on the outer periphery of the frame. Even if the adhesive supplying means is thus relatively moved so as to avoid the projecting portion, it is possible to supply the adhesive uniformly to the entire area of the annular portion of the frame.

Embodiment

The embodiments of the speaker apparatus and the method of manufacturing the same according to the invention will be described in detail with reference to drawings.

Figure 2:
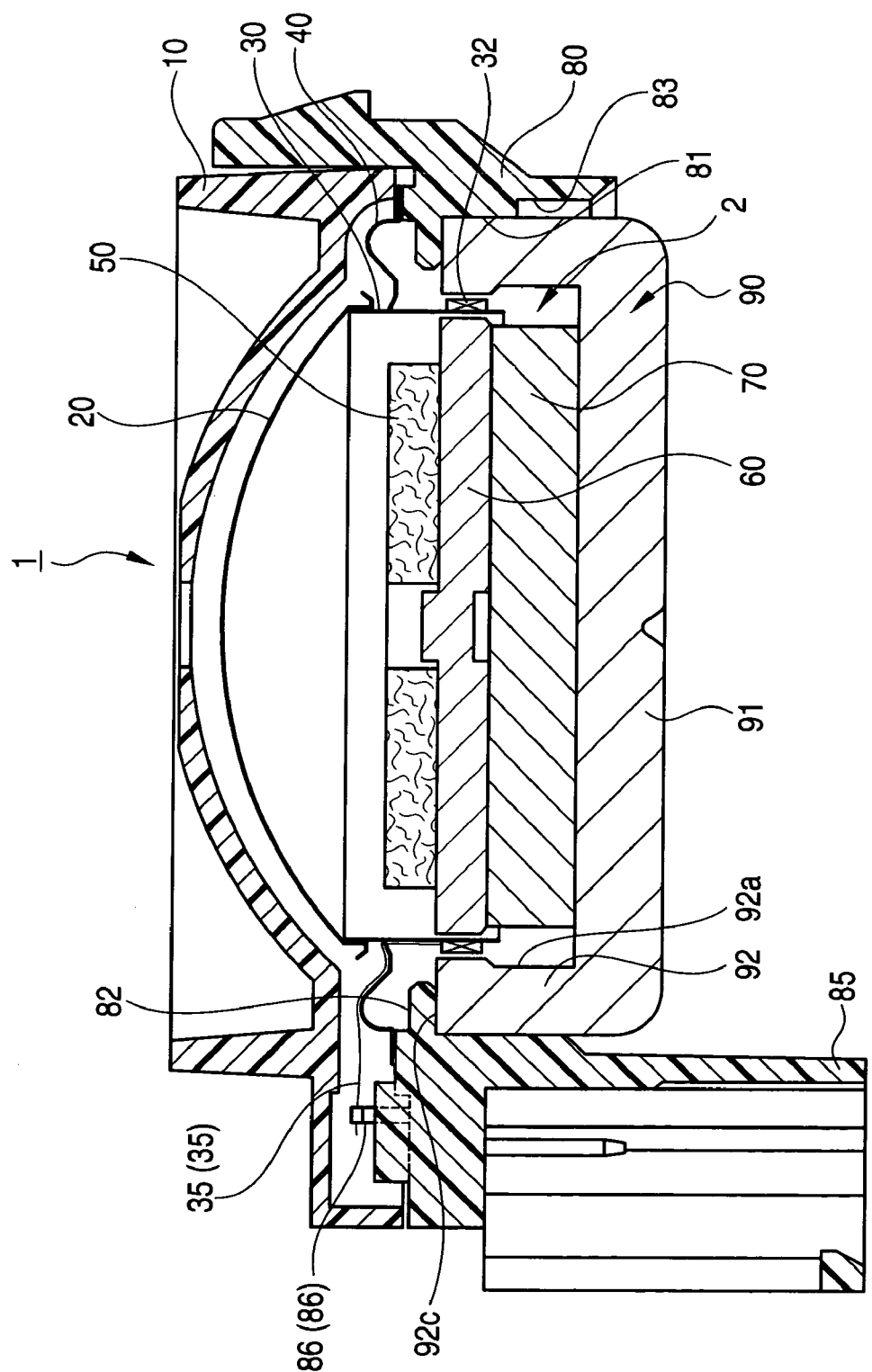
FIG. 2 is a cross-sectional view of a speaker apparatus according to an embodiment of the invention.
Figure 3:
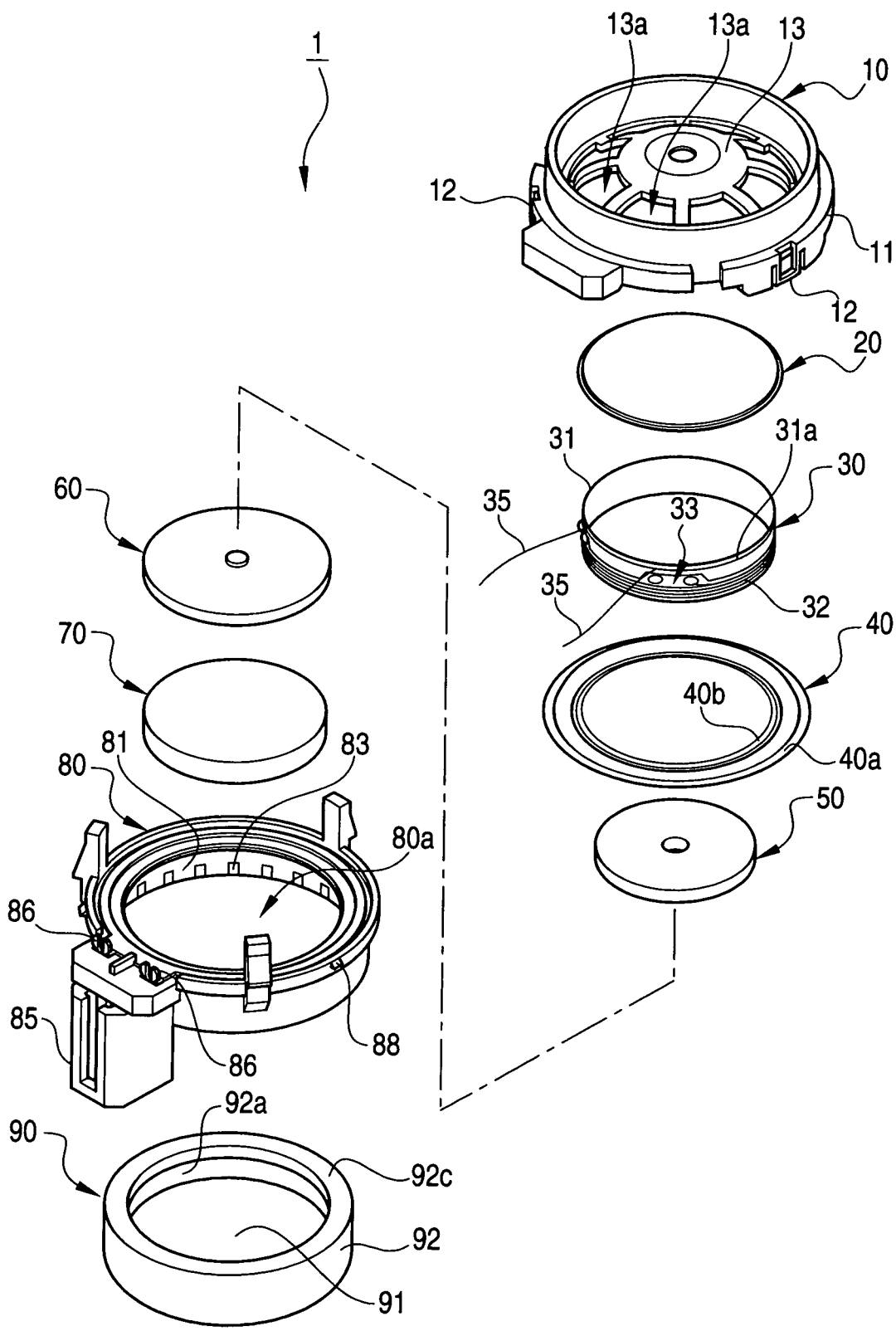
FIG. 3 is an exploded perspective view of the speaker apparatus according to an embodiment of the invention.
Figure 4:
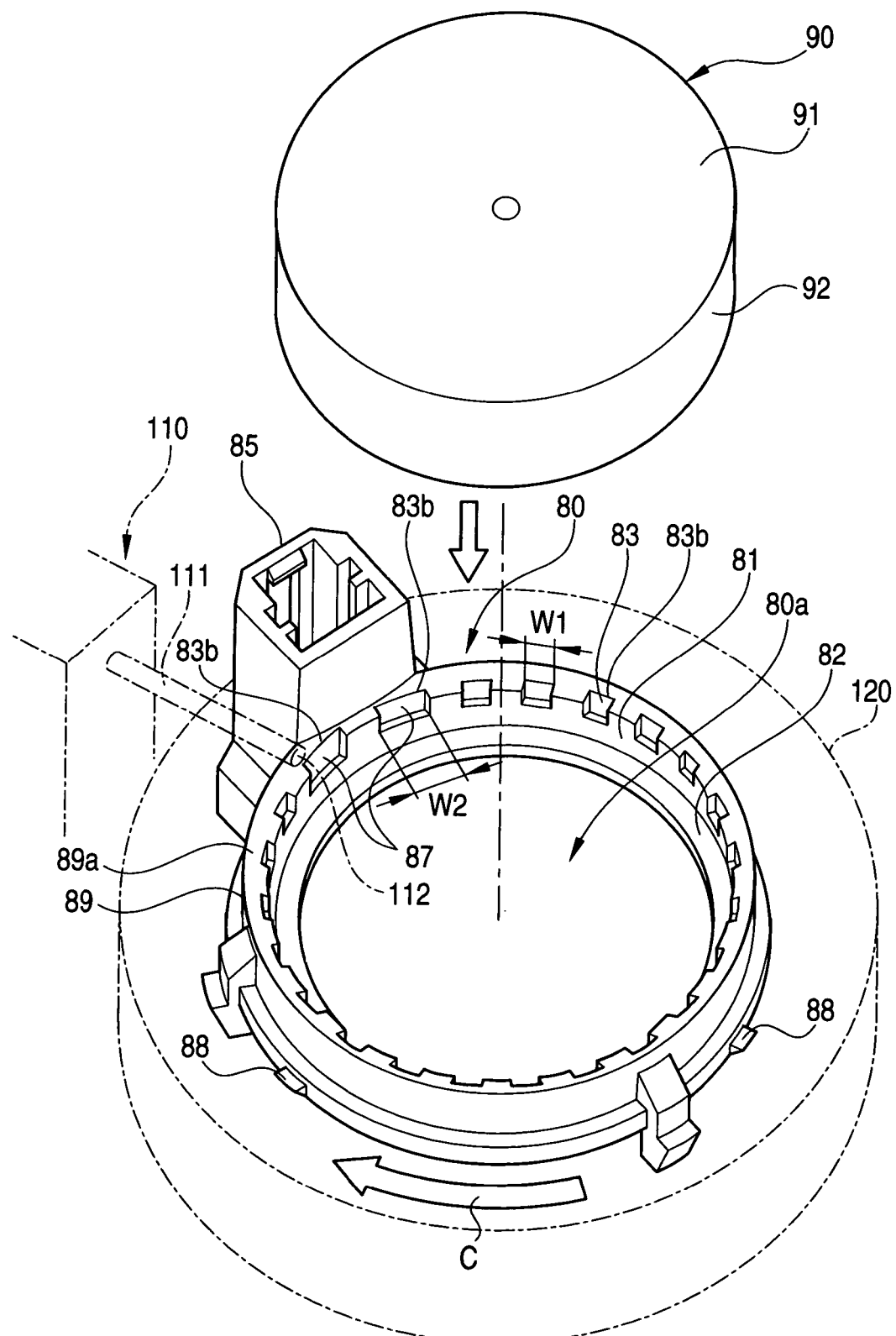
FIG. 4 is an enlarged perspective view of essential portions for explaining an operation of bonding a pot type yoke and a frame according to an embodiment of the invention.
Figure 5:
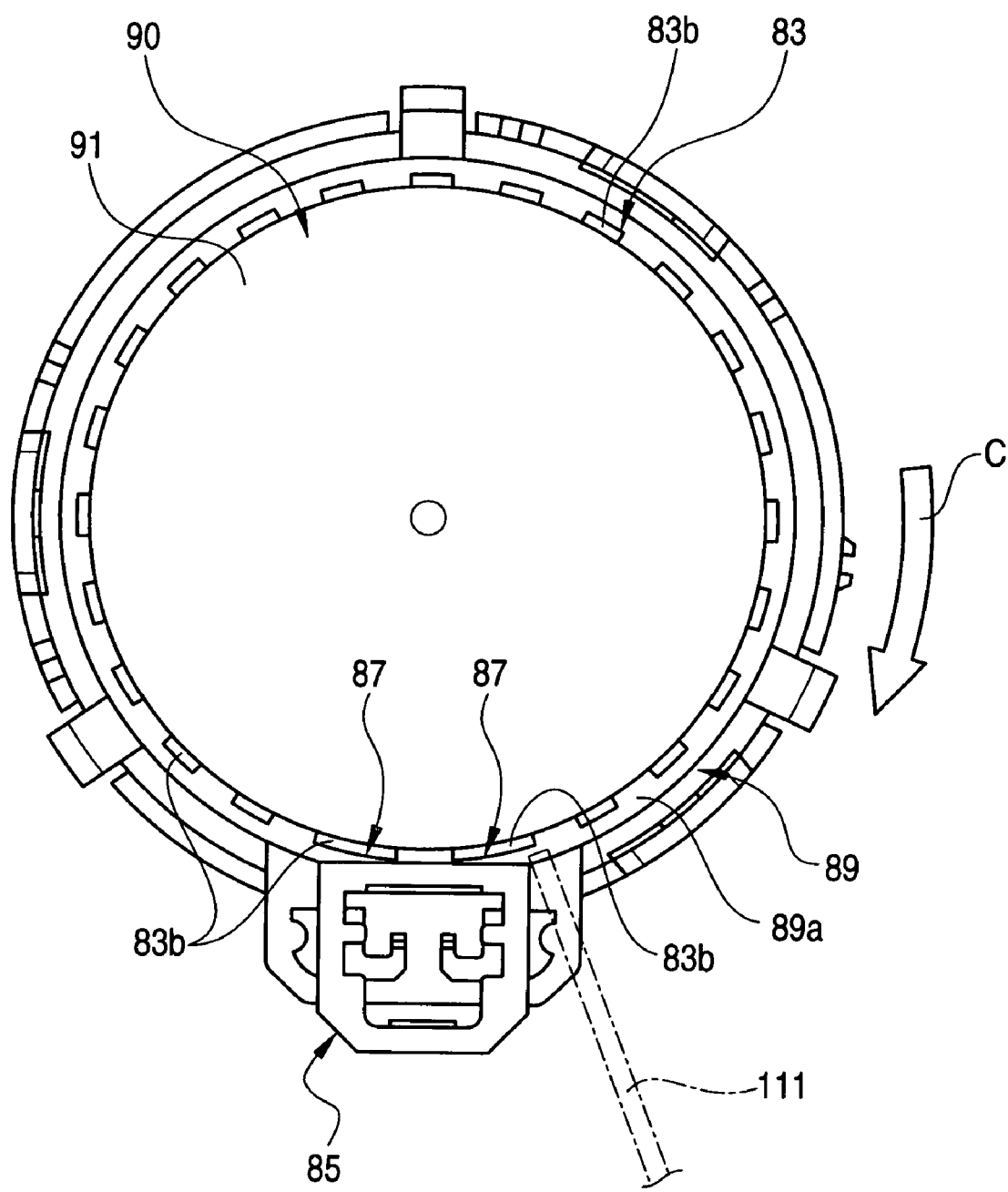
FIG. 5 is a plan view of essential portions for explaining the operation of bonding the pot type yoke and the frame according to an embodiment of the invention.

FIG. 2 is a cross-sectional view of the speaker apparatus according to the embodiment, and FIG. 3 is an exploded perspective view of the speaker apparatus. FIG. 4 is an enlarged perspective view illustrating a pot type yoke and a frame according to the embodiment, and FIG. 5 is a plan view of a state in which the pot type yoke is fitted in the frame.

A speaker apparatus 1 according to the embodiment is a so-called dome type speaker apparatus, and is configured with a cover 10, a diaphragm 20, a voice coil 30, an edge 40, a sound absorbing material 50, a top plate 60, a magnet 70, a frame 80, and a pot type yoke 90, as shown in FIGS. 2 and 3.

In the speaker apparatus 1 of the embodiment, the pot type yoke 90 is bonded and fixed abuttingly to an inner peripheral surface 81 of the frame 80 having a circular annular portion 89 with an opening 80a formed in its center. The magnet 70, the top plate 60, and the sound absorbing material 50 are consecutively laminated and disposed in this pot type yoke 90. In the speaker apparatus 1 of the embodiment, a magnetic circuit is configured with the top plate 60, the magnet 70, and the pot type yoke 90.

The pot type yoke 90 is a metallic yoke having a disk-shaped bottom portion 91 and an annular wall portion 92 provided upwardly on an outer peripheral edge of the bottom portion 91, and has a substantially U-shaped cross-sectional shape. This pot type yoke 90 is formed by subjecting a metal serving as a base material to forging and cutting work. As a result, the bottom portion 91 and the wall portion 92 are formed integrally. As shown in FIG. 2, this pot type yoke 90 is positioned with respect to the frame 80 as an upper end 92*c* of the wall portion 92 abuts against an annular rib 82 provided projectingly on the inner peripheral surface 81 of the frame 80. In this state, the adhesive is allowed to flow to grooves 83 which are adhesive pools formed along the circumferential direction of the inner peripheral surface 81, thereby allowing the pot type yoke 90 to be bonded and fixed to the frame 80.

The magnet 70, the top plate 60, and the sound absorbing material 50 are consecutively laminated and disposed on the bottom portion 91 of this pot type yoke 90. The top plate 60 and the magnet 70 are respectively disk-shaped members, and are fixed with a predetermined interval with an inner peripheral surface 92*a* of the wall portion 92 of the pot type yoke 90. As a result, a magnetic gap 2 is formed between the inner peripheral surface 92*a* of the wall portion 92 of the pot type yoke 90 and each of the top plate 60 and the magnet 70.

The voice coil 30 is disposed in the magnetic gap 2. The voice coil 30 is one in which a winding 32 is wound around an outer peripheral surface 31*a* of a hollow cylindrical voice coil bobbin 31. Two ends of the winding 32 are respectively connected to one ends of a pair of lead wires 35 at a connecting portion 33 formed on the outer peripheral surface 31*a* of the voice coil bobbin 31. The other ends of the pair of lead wires 35 are respectively connected to a pair of terminals 86 provided in a connector 85 formed integrally with the frame 80. Connecting cables connected to an unillustrated amplifier are connected at this connector 85. Consequently, an electric current which is outputted from the amplifier in response to an audio signal flows across the winding 32 through the connector 85 and the lead wires 35.

An axial end of the voice coil bobbin 31 is connected to the diaphragm 20. The diaphragm 20 has a dome shape, and as the voice coil 30 is driven by the electric current flowing across the winding 32 of the voice coil 30, the diaphragm 20 vibrates and generates sound.

In addition, the annular edge 40 is disposed around the voice coil bobbin 31. The edge 40 has its outer peripheral end 40*a* fixed to the frame 80, and holds the voice coil bobbin 31 by means of its inner peripheral portion 40*b*.

The cover 10 is disposed above the diaphragm 20. The cover 10 is formed in a dome shape corresponding to the shape of the diaphragm 20. As engaging pieces 12 formed in the circumferential direction along an outer peripheral wall 11 of the cover 10 are engaged with engaging projections 88 formed on the frame 80, the cover 10 is positioned and fixed on the frame 80. A plurality of sound output holes 13*a* for outputting the sound generated from the diaphragm 20 are formed in a dome portion 13 of the cover 10. The provided configuration is such that the diaphragm 20 is physically protected from the outside, and the sound generated from the diaphragm 20 is appropriately outputted.

In this embodiment, the frame 80 has the connector 85 disposed on the outer peripheral side of the annular portion 89 and projecting more than an end face 89*a* of this annular portion 89. Further, grooves 87 are formed on a portion of the inner peripheral surface 81 of the annular portion 89 which substantially corresponds to a portion on which the connector 85 is provided. Each of the grooves 87 has an open port 83*b* which communicates with the end face 89*a* and is partially open outward more than the connector 85 in the circumferential direction of the frame.

In addition, as for the frame 80 of this embodiment, the groove width W2 of the two grooves 87 formed on that portion of the inner peripheral surface 81 that substantially corresponds to the connector 85 is configured to be greater than the groove width W1 of the other grooves 83.

Next, referring to FIGS. 3 to 5, the method of manufacturing a speaker apparatus according to this embodiment will be described.

First, the pot type yoke 90 for forming the magnetic circuit is fitted to the inner side of the annular portion 89 of the frame 80.

Subsequently, an adhesive is supplied to the gap between this annular portion 89 and the pot type yoke 90 through an adhesive supplying means 110 to effect bonding and fixation.

Subsequently, the pot type yoke 90 and the frame 80 are reversed, and the magnet 70, the top plate 60, and the sound absorbing material 50 are consecutively laminated and disposed on the bottom portion 91 of the pot type yoke 90. Further, the edge 40, the voice coil 30, and the diaphragm 20 are built in, and are appropriately fixed by the adhesive.

Finally, the cover 10 is built in and fixed so as to engage the frame 80, thereby completing the assembly.

Hereafter, referring to FIGS. 4 and 5, the operation of supplying the adhesive after the pot type yoke 90 is inserted and fitted to the inner side of the annular portion 89 of the frame 80 will be described.

The frame 80 with the pot type yoke 90 incorporated therein is held on a seating base 120 such as the one shown in FIG. 4. The adhesive supplying means 110 is disposed at a position located in close proximity to this seating base 120. A supply head 111 of this adhesive supplying means 110 has its supply port 112 opposing the end face 89*a* of the annular portion 89.

The supply of the adhesive is effected while the seating base 120 is rotated (rotated in the direction of arrow C in the drawings). Namely, the adhesive is supplied starting with one groove 87, and is supplied continuously up to the other groove 87.

Thus, one groove 87, which substantially corresponds to the portion of the connector 85 projecting more than the end face 89*a* of the annular portion 89 and which has the open port 83*b* that is partially open outward more than the connector 85 in the circumferential direction of the frame, is used at the beginning in the operation of supplying the adhesive to the gap between the annular portion 89 and the pot type yoke 90. In this adhesive supplying operation, the adhesive can thus be supplied by causing the supply head 111 to correspond to this opening from the side of the connector 85.

Namely, the adhesive is supplied by relatively moving the supply head 111 along the annular portion 89 of the frame 80 over an area excluding the connector 85. Hence, even in the case of the frame 80 on which a projecting portion such as the connector 85 is provided, the adhesive can be allowed to flow to the grooves 87 located on the inner side of the connector 85 by using an automated machine. Therefore, according to such an assembling method, it is possible to provide a speaker apparatus which excels in the assembling efficiency and makes it possible to supply the adhesive uniformly over the entire area of the annular portion of the frame 80 and maintain the bonding strength.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A speaker apparatus comprising:

a frame having an annular portion; and a member for configuring a magnetic circuit, which is fixed to an inner side of the annular portion by means of an adhesive, wherein the frame has a projecting portion disposed on an outer peripheral side of the annular portion and projecting more than an end face of the annular portion, at least a first groove and a second groove are formed on an inner peripheral surface of the frame and respectively have open ports communicating with the end face, and the open port of the second groove, which is formed on a portion of an inner peripheral surface of the annular portion which substantially corresponds to a portion on which the projecting portion is provided, is partially open outward more than the projecting portion in a circumferential direction of the frame.

2. The speaker apparatus according to claim 1, wherein the projecting portion is a connector which is electrically connected to an external circuit.

3. The speaker apparatus according to claim 1, wherein a groove width of the second groove is configured to be greater than a groove width of the first grooves.

4. A method of manufacturing a speaker apparatus including steps of inserting a member for configuring a magnetic circuit to an inner side of an annular portion of a frame and supplying an adhesive to a gap between the annular portion and the member through adhesive supplying means, comprising steps of:

using a member as the frame, which has a projecting portion disposed on an outer peripheral side of the annular portion and projecting more than an end face of the annular portion, a groove being formed on a portion of an inner peripheral surface of the annular portion of the frame that corresponds to a portion on which the projecting portion is provided, the groove having an open port communicating with the end face and being partially open outward more than the projecting portion in a circumferential direction of the frame; and supplying the adhesive to a part of the open port, which is open outward more than the projecting portion in the circumferential direction of the frame, by means of the adhesive supplying means.

5. The method of manufacturing a speaker apparatus according to claim 4, wherein the adhesive is supplied as the adhesive supplying means is relatively moved along the annular portion over all excluding the portion on which the projecting portion is provided.

* * * * *